(12) United States Patent
Yoder

(10) Patent No.: US 6,383,243 B1
(45) Date of Patent: May 7, 2002

(54) QUICK CONNECT FLUID COUPLING FOR AN AIR CLEANER

(75) Inventor: Lamar D. Yoder, Fort Wayne, IN (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/651,681

(22) Filed: Aug. 30, 2000

(51) Int. Cl.[7] .............................. B01D 35/14; G01L 7/08
(52) U.S. Cl. ..................... 55/385.3; 96/417; 116/268; 116/283; 285/322; 285/323
(58) Field of Search ...................... 55/385.1, 385.3; 96/417; 123/198 E; 116/268, 283; 285/322, 323; 340/607

(56) References Cited

U.S. PATENT DOCUMENTS

| | | | | |
|---|---|---|---|---|
| 3,556,043 A | * | 1/1971 | Vayda | ................. 116/268 |
| 4,369,728 A | | 1/1983 | Nelson | |
| 4,445,456 A | * | 5/1984 | Nelson | ................. 116/268 |
| 5,230,539 A | | 7/1993 | Olson | |
| 5,468,028 A | | 11/1995 | Olson | |
| 5,730,475 A | * | 3/1998 | Kargula | ................. 285/323 |
| 5,774,056 A | | 6/1998 | Berry, III et al. | |
| 5,850,183 A | * | 12/1998 | Berry, III | ................. 340/607 |
| 5,887,911 A | * | 3/1999 | Kargula | ................. 285/323 |
| 6,079,750 A | * | 6/2000 | Kacines | ................. 285/322 |
| 6,254,144 B1 | * | 6/2001 | Hagan | ................. 285/323 |

* cited by examiner

*Primary Examiner*—David A. Simmons
*Assistant Examiner*—Minh-Chau T. Pham
(74) *Attorney, Agent, or Firm*—Jeffrey P. Calfa; Dennis Kelly Sullivan; Neil T. Powell

(57) ABSTRACT

The invention provides an apparatus and method to monitor air filter restriction within an air cleaner system of a motor vehicle. The invention uses a quick connect couplig to allow fluid communication between a restriction gauge and the air cleaner housing and also provides a means of attaching the restriction gauge or a remote tubing connector to the air cleaner housing. The quick connect coupling is located within an axial bore, generally within a conduit in the housing. A portion of the filtered air is drawn from the air cleaner housing through the quick connect coupling and into the restriction gauge, where the pressure is measured and the amount of air filter restriction is gauged.

12 Claims, 3 Drawing Sheets

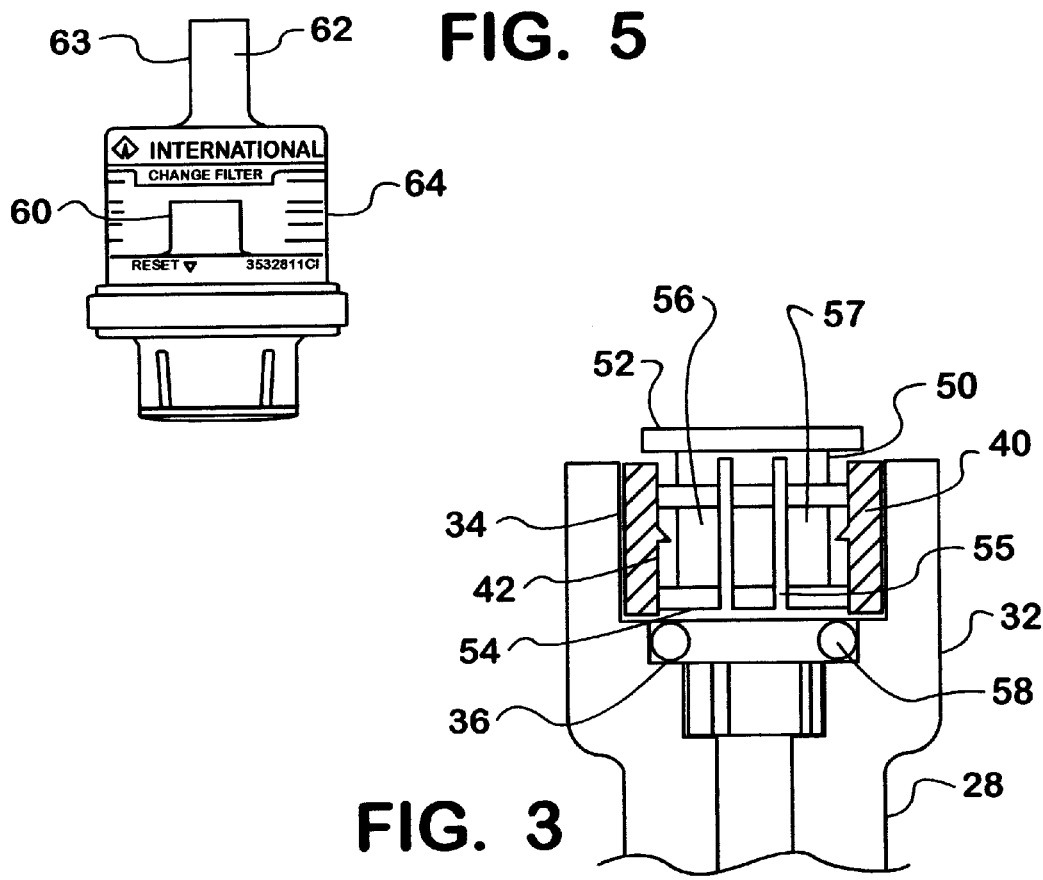
FIG. 5
FIG. 3
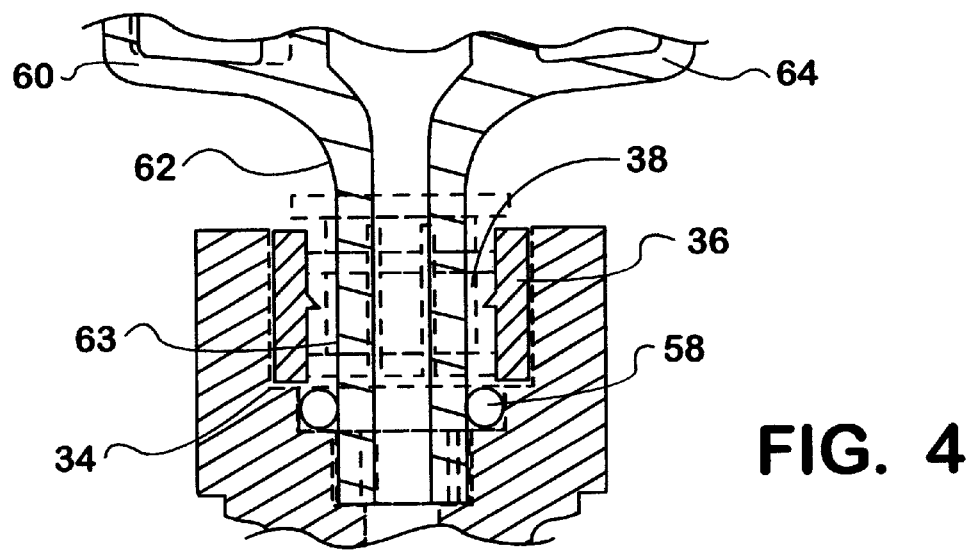
FIG. 4

QUICK CONNECT FLUID COUPLING FOR AN AIR CLEANER

BACKGROUND OF THE INVENTION

1. Field of the Invention

The present invention relates to a method and apparatus to measure filtered air pressure in a motor vehicle's engine air intake system with a restriction gauge.

2. Description of the Prior Art

A motor vehicle's engine combustion system depends on a sufficient quantity of air. Because cooler air is denser, engines combust cooler air more efficiently than warmer air. Therefore, vehicles, especially heavy trucks, draw outside air into the vehicle's air intake system for engine combustion. Along with outside air, however, particulates are also drawn into the air intake system with the outside air.

Outside air enters the air intake system of a heavy duty truck, often through a port in the hood. Then outside air passes through a duct into an air cleaner. The air cleaner routes the air through a filter system that includes the air filter and any precleaners. The air filter traps particulates and keeps them from entering the engine system.

The air filter must be kept relatively clean. A dirty or clogged air filter restricts the flow of outside air and increases negative pressure, or vacuum, within the filtered air system. This decreases engine efficiency and performance.

In order to ensure a vehicle does not operate under a clogged filter condition, one can either replace the filter at regular intervals or use a restriction gauge to monitor the pressure in the air cleaner system. Replacement at preset intervals of time or mileage increases service time and produces costly downtime and over-servicing the filter. Over-servicing prematurely removes the normal build of dust particles which increases the filtering efficiency of the air filter and reduces airflow restriction. Over the life of the vehicle, over-servicing of the air filter actually allows more total particulates to pass through the filter into the engine, a detrimental effect on the service life of the engine. Over-servicing also increases the likelihood of filter damage and improper installation. A damaged filter allows dust into the engine, resulting in major engine failure.

A dirty or clogged air filter produces a high vacuum in the line between the air cleaner and the engine. At high vacuum, engine oil can be drawn past turbocharger seals resulting in increased oil consumption and exhaust emission levels. If the operating vacuum becomes high enough, the air filter may collapse and air filter particles, dust particles or oil can be drawn into the combustion chamber, particularly with turbo-charged diesel engines. This can ruin the engine in a short period of time.

Therefore, it is preferable to use a low cost device, such as a restriction or pressure gauge connected to the air cleaner system, to indicate the relative clogging levels of the filter. The gauge responds to decreases in air pressure flowing through the air cleaner system to indicate the restriction or clogging in the air filter. The gauge is connected to the filtered air intake system downstream of the filter element and prior to any engine connection. A port may be provided directly in the air cleaner housing or in the air line between the air cleaner housing and the engine. The gauge may be mounted directly to air cleaner housing, to the air line between the air cleaner housing and the engine, or remotely. When connected remotely, the gauge is usually located in the dashboard and connected to the housing by tubing.

In the prior art, restriction gauges connect to the air cleaner systems in a number of ways. Typically the gauge is attached by threaded connectors or rubber grommets.

Threaded connectors have a number of problems, however. Threaded connectors require either tapered interference threads (pipe threads) or straight threads with O-ring seals to prevent air from leaking into the system.

Threaded connectors require careful assembly. With threaded connectors, the assembly worker can easily overtighten the tapered threads. Overtightening can easily damage the system's components. In many cases the system's components are typically molded plastic parts, which require replacement if damaged. Overtightened components can also be difficult to detach and replace if broken or defective. Therefore to prevent overtightening, the torque must be accurately controlled. The assembly worker must align threaded connectors properly so the connectors fit together properly. Misaligned connectors can leak air which renders the restriction indicator inoperative and requires repair.

Assembling threaded attachments with O-ring seals requires the assembly operator to handle an additional loose part. Threaded connectors also require sufficient space for tools, such as wrenches, so they are difficult to use in locations with tight clearances.

Elastomeric seals, such as rubber grommets, are also used by prior art methods, often with mounting plates. Like threaded connectors, rubber grommets require careful assembly. When retained by a rubber grommet, both the seal and retention of the restriction gauge highly depends on the fit of the grommet to the housing and careful assembly. Rubber also degrades over time and exposure to the environment, which can lead to the loss of the seal and leakage of air into the system, thereby rendering the restriction indicator system inoperative. Complete failure of the grommet can allow the restriction gauge or line to separate from the air intake system and allow unfiltered air to enter the engine, resulting in major engine failure.

The gauge can also lock into place by fitting triangular shaped flanges into a triangular shaped wall. This method requires placing the fitting into a specially designed wall, then turning the device a ¼ turn. A grommet or other elastomeric seal is between the outer wall and the housing of the gauge. This method requires the wall to be specially designed and manufactured to fit the configuration of the flanges.

Thus, one of the objects of the invention is to use an easy method to check the condition of the air cleaner system. Another object of the invention is to provide a housing and method that allows the quick, accurate and reliable installation of components for a restriction gauge. Another object is to decrease the reliance on the skill level of the assembly worker.

SUMMARY OF THE INVENTION

According to the invention there is provided an apparatus and method to monitor air filter restriction within an engine air cleaner system of a motor vehicle. The air cleaner apparatus has a housing with walls and a chamber defined by the outer wall extending circumferentially and transverse to the end wall. The housing has an intake air opening in one wall in fluid communication with the chamber. Within the chamber is an air filter having a filtering matrix surrounding a filtered air passageway. In one wall is a filtered air opening in fluid communication with the air filter. Disposed within an axial bore is a quick connect coupling. The quick connect coupling is in fluid communication with the filtered air in the conduit.

In the method of the invention, air is drawn into an air cleaner housing through an intake air opening in one wall of the housing in fluid communication with the chamber. Within the chamber, the air is filtered by an air filter disposed within the chamber. The air filter has a filtering matrix surrounding a filtered air passageway. Filtered air is then transferred into the filtered air passageway or directly into a filtered air opening located in one wall of the housing. Then the filtered air passes through a quick connect coupling disposed within an axial bore and into a restriction gauge in fluid communication with the quick connect coupling. The restriction gauge measures the pressure of the filtered air. If the measured filtered air pressure is low, the filter has a greater amount of clogging or restriction and should be serviced.

Additional effects, features and advantages will be apparent in the written description that follows.

BRIEF DESCRIPTION OF THE DRAWINGS

The novel features believed characteristic of the invention are set forth in the appended claims.

The invention itself however, as well as a preferred mode of use, further objects and advantages thereof, will best be understood by reference to the following detailed description of an illustrative embodiment when read in conjunction with the accompanying drawings, wherein:

FIG. 3 is a partial view of a quick connect coupling within an axial bore within the air cleaner housing;

FIG. 4 is a partial cross-sectional view of a restriction gauge within a quick connect coupling within an axial bore within the air cleaner housing, showing a collet in phantom lines; and FIG. 5 is a restriction gauge.

DETAILED DESCRIPTION OF THE INVENTION

Figure 1:
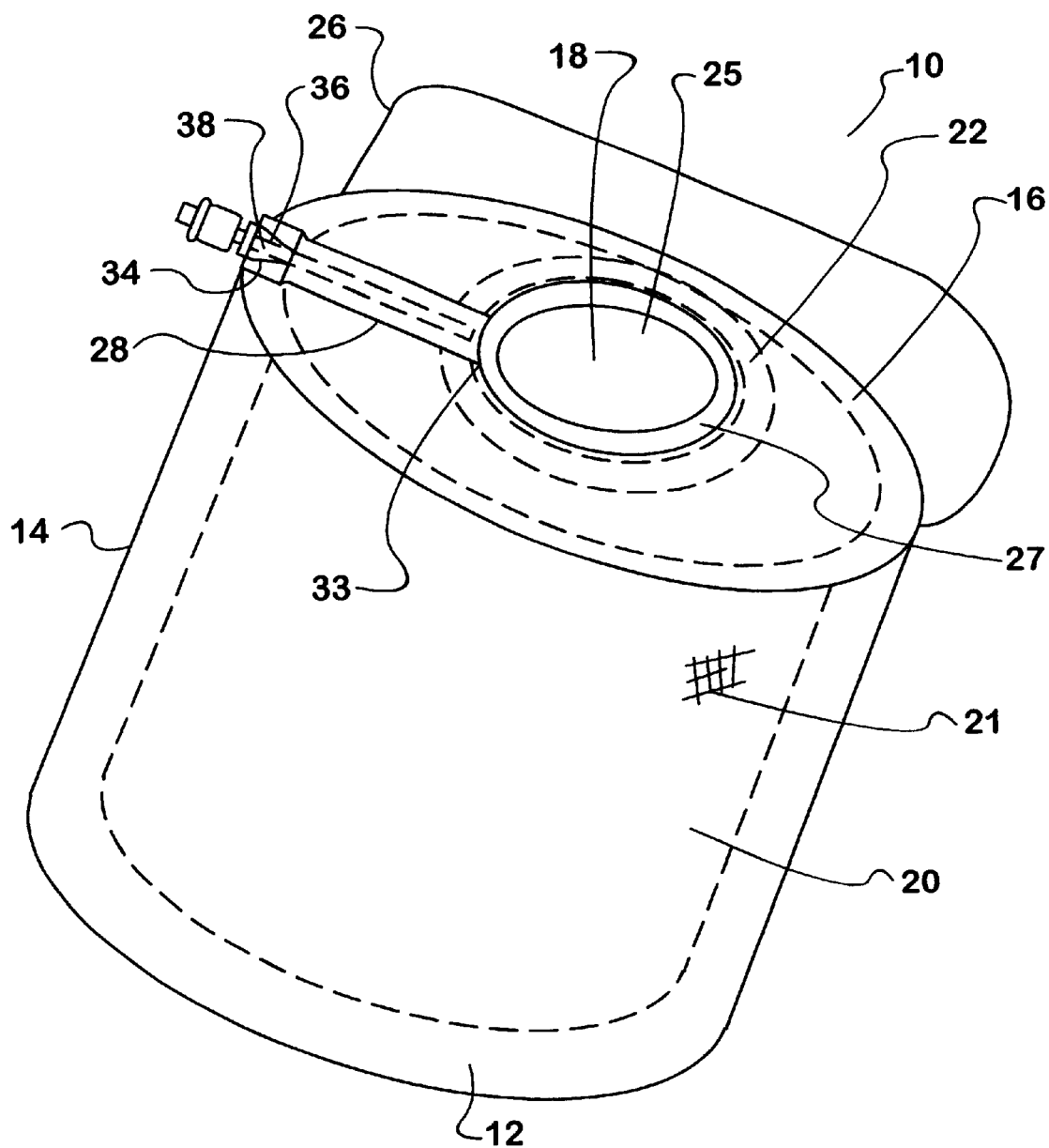
FIG. 1 is a perspective view of an air cleaner apparatus of the invention with a restriction gauge attached directly to the housing with the air filter shown in phantom lines.
Figure 2:
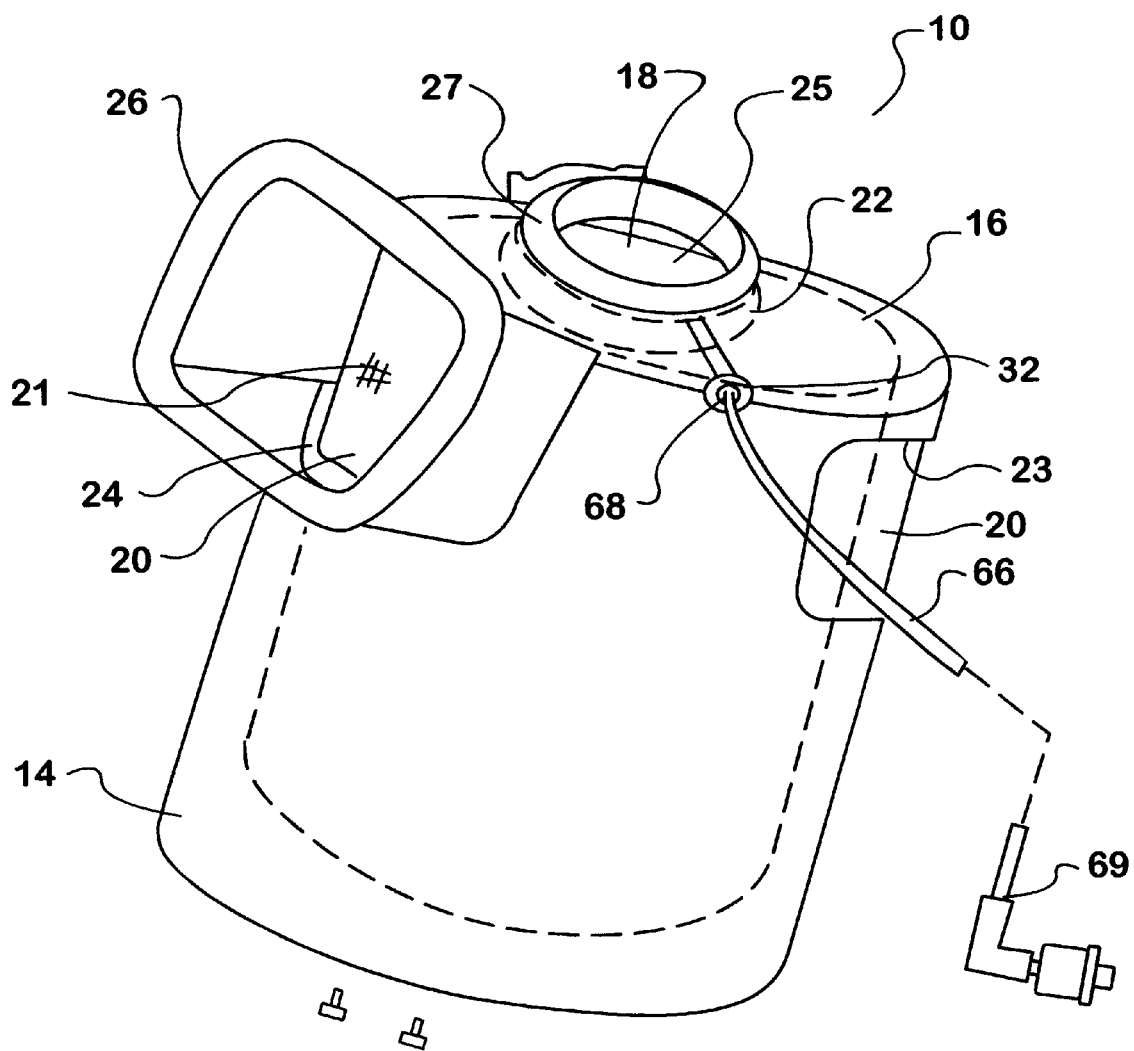
FIG. 2 is a perspective view of an air cleaner apparatus of the invention with a restriction gauge attached remotely with the air filter shown in phantom lines.

Turning to the figures where like reference numerals refer to like features, an air cleaner apparatus for a motor vehicle, preferably a heavy duty truck is shown. FIGS. 1 and 2 show air cleaner apparatus 10 with housing 12 having outer wall 14 extending circumferentially. End wall 16 is transverse to outer wall 14. Outer wall 14 and end wall 16 define chamber 18. Chamber 18 contains air filter 20. Air filter has a filtering matrix 21 surrounding filtered air passageway 22. One wall of housing 12 has filtered air opening 25 in fluid communication with air filter 20, either through the filtered air passageway 22 or directly from filtering matrix 21. Filtered air opening 25 may be surrounded by collar 27.

Housing 12 has intake air openings 23, 24 in one wall in fluid communication with chamber 18. Air opening 24 can be surrounded by a flange 26 or seal to direct the flow of air into the air opening. Typically, a flow of outside air comes from an air intake duct connecting the flange with a hood inlet (not shown).

Quick connect coupling 36 is located within axial bore 34 in housing 12. Quick connect coupling 36 has coupling bore 38 in fluid communication with the filtered air. Although FIGS. 3 and 4 show axial bore 34 as stepped, it can be unstepped as well. Preferably, axial bore 34 is disposed within conduit 28, although it could also be disposed within collar 27 or within the filtered air line between the housing and the engine (not shown).

Conduit 28 is in fluid communication with the filtered air. Conduit 28 has opposite first 32 and second 33 conduit ends. First conduit end 32 opens to the outside of housing 12, while second conduit end 33 opens within housing 12 to receive filtered air. Conduit 28 could be located adjacent to the end wall with the first end open at a wall and the second end open to receive filtered air, such as opened in filtered air passageway 22, collar 27 or filtered air opening 25. Alternatively, conduit 28 can be molded into end wall 16 and extends from the interior of housing 12 to the exterior of housing 12, although it could also extend through outer wall 14.

There are a wide variety of couplings which permit a tube to be quickly and easily connected to a body without the use of tools. These quick connect couplings are well known in the automotive and trucking industry for air brake and air conditioning systems. Typically, the coupling contains a plurality of parts to releasably retain the tube therein.

Examples of quick connect couplings are disclosed in U.S. Pat. Nos. 5,230,539 and 5,468,028. Turning to FIG. 3, the typical coupling has a hollow cylindrical sleeve 40 which is press fit or otherwise retained in axial bore 34. Sleeve 40 has an inner surface 42 which is at least partially frusto-conical. A generally hollow cylindrical collet 50 is located within sleeve. Collet 50 may have collet flange 52 located outside sleeve 40. Collet 50 has slits 54, 55 to produce a plurality of flexible fingers 56, 57. Each finger has an outer frusto-conical surface which cooperates with the inner frusto-conical surface of the sleeve. Each finger also has one or more radially inwardly extending teeth.

FIG. 4 shows restriction gauge 60 in fluid communication with chamber 18. Restriction gauge housing 64 of restriction gauge 60 has tubular member 62. Tubular member 62 inserts within quick connect coupling 36. Outer surface 63 of tubular member 62 engages fingers 56,57, flexing them radially outwardly toward the corresponding inner frusto-conical surface 42 of sleeve 40. To prevent the removal of tubular member 62 from quick connect coupling 36, the outer frustoconical surface of collet 50 engages the inner frusto-conical surface of sleeve 40. The radially inwardly extending teeth of fingers 56, 57 engage outer surface 63 of tubular member 62 and prevent the restriction gauge's removal. As a result, collet 50 with tubular member 62, positively lock within quick connect coupling 36 and housing 12. O-ring 58 provides an air tight seal between tubular member 62 and conduit 28.

The restriction gauge can be installed in another location for remote readings, such as in the vehicle's dashboard or another remote underhood location and is in fluid communication with the air cleaner. As shown in FIG. 2, the first tubing end 68 of tubing 66 inserts into quick connect coupling 36 in axial bore 34. The second tubing end 69 of tubing 66 is connected directly or indirectly with a remote mounted restriction indicator (not shown).

Examples of restriction gauges are found in U.S. Pat. Nos. 4,369,728, 4,445,456 and 5,774,056. Because the restriction gauge is in fluid communication with the filtered air, the restriction gauge measures the filtered air's pressure. Lower filtered air pressures indicate higher vacuum levels and greater amounts of filter clogging.

Using quick connect couplings in the air cleaner system for connecting a restriction gauge with the air cleaner system has a number of advantages. The method of the invention is an easy way to check the pressure of the air cleaner system. The quick connect coupling allows the insertion of the restriction gauge or tubing with a low insertion force. Yet, removal from the coupling requires high pull-off forces. Therefore, the restriction gauge is less likely to be accidentally "knocked off" or removed from the system.

The quick connect coupling can be either flush with the exterior of the housing or extend slightly outside to the housing. This low profile is less likely to be damaged during shipment of the air cleaner housing to the assembly line. In addition, this low profile is less likely to be broken off during use.

The invention decreases the reliance on the skill level of the assembly worker. The quick connect coupling is typically press fit into the axial bore in any orientation. The restriction gauge is simply fit into the quick connect coupling without twisting or turning the gauge. The quick connect coupling is not threaded, thus the restriction gauge cannot be overtightened or misthreaded during installation.

While the invention is shown in only one of its forms, it is not thus limited but is susceptible to various changes and modifications without departing from the spirit and scope of the invention.

What is claimed is:

1. An air cleaner apparatus for a motor vehicle comprising:
   a housing having walls and a chamber defined by the walls, the walls including an outer wall extending circumferentially and transverse to an end wall;
   an intake air opening in one wall in fluid communication with the chamber;
   an air filter disposed within the chamber and having a filtering matrix surrounding a filtered air passageway;
   a filtered air opening in one wall in fluid communication with the air filter;
   an axial bore; and
   a quick connect coupling disposed within the axial bore and in fluid communication with the air filter.

2. An air cleaner apparatus for a motor vehicle of claim 1, further comprising:
   a conduit in fluid communication with the air filter, the conduit having opposing first and second conduit ends; and
   wherein the axial bore is located within the conduit.

3. An air cleaner apparatus for a motor vehicle of claim 2, wherein the second conduit end opens into the filtered air opening.

4. An air cleaner apparatus for a motor vehicle of claim 3, wherein the conduit is within one wall of the housing.

5. An air cleaner apparatus for a motor vehicle of claim 4, further comprising: a restriction gauge in fluid communication with the quick connect coupling.

6. An air cleaner apparatus for a motor vehicle of claim 5, further comprising: a tubular member of the restriction gauge matingly engaging the quick connect coupling.

7. A method of monitoring air filter restriction within an air cleaner system of a motor vehicle, the method comprising the steps of:
   providing a housing having walls and a chamber defined by the walls, the walls including an outer wall extending circumferentially and transverse to an end wall;
   drawing air into the housing through an intake air opening in one wall in fluid communication with the chamber;
   filtering air through an air filter disposed within the chamber;
   transferring filtered air into a filtered air opening located in one wall of the housing;
   providing a quick connect coupling disposed within an axial bore;
   allowing fluid communication between a restriction gauge and the quick connect coupling; and
   measuring the pressure of the filtered air with the restriction gauge.

8. A method of monitoring air filter restriction within an air cleaner system of a motor vehicle of claim 6, wherein the axial bore is disposed within the conduit, the conduit having opposing first and second conduit ends and being in fluid communication with the filtered air.

9. A method of monitoring air filter restriction within an air cleaner system of a motor vehicle of claim 8, the method further comprising the step of:
   matingly engaging a tubular member of the restriction gauge with the quick connect coupling.

10. A method of monitoring air filter restriction within an air cleaner system of a motor vehicle of claim 9, wherein the axial bore is disposed at the first conduit end.

11. A method of monitoring air filter restriction within an air cleaner system of a motor vehicle of claim 10, wherein the second conduit end opens into the filtered air opening.

12. A method of monitoring air filter restriction within an air cleaner system of a motor vehicle of claim 10, wherein the conduit is in one wall of the housing.

* * * * *